(12) United States Patent
Shiohara (10) Patent No.: US 10,191,703 B2
(45) Date of Patent: Jan. 29, 2019

(54) INFORMATION PROCESSING APPARATUS, INFORMATION PROCESSING METHOD, AND STORAGE MEDIUM

(71) Applicant: CANON KABUSHIKI KAISHA, Tokyo (JP)

(72) Inventor: Tetsuya Shiohara, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 241 days.

(21) Appl. No.: 15/148,471

(22) Filed: May 6, 2016

(65) Prior Publication Data

US 2016/0246557 A1    Aug. 25, 2016

Related U.S. Application Data

(63) Continuation of application No. 12/969,019, filed on Dec. 15, 2010, now Pat. No. 9,377,984.

(30) Foreign Application Priority Data

Dec. 24, 2009    (JP) .................................. 2009-292771

(51) Int. Cl.
*G06F 17/00* (2006.01)
*G06F 3/12* (2006.01)
*G06F 17/21* (2006.01)

(52) U.S. Cl.
CPC .......... *G06F 3/1262* (2013.01); *G06F 3/1205* (2013.01); *G06F 3/1206* (2013.01); *G06F 3/1246* (2013.01); *G06F 3/1252* (2013.01); *G06F 3/1256* (2013.01); *G06F 3/1267* (2013.01); *G06F 3/1273* (2013.01); *G06F 3/1276* (2013.01); *G06F 3/1284* (2013.01);
(Continued)

(58) Field of Classification Search
CPC .............................. G06F 17/212; G06F 17/20
See application file for complete search history.

(56) References Cited

U.S. PATENT DOCUMENTS 6,757,070 B1   6/2004   Lin et al.
6,961,135 B1   11/2005  Nakagiri et al.
7,225,440 B2   5/2007   Himmel et al.
(Continued)

FOREIGN PATENT DOCUMENTS

JP   2001-134408 A   5/2001
JP   2001-159661 A   6/2001
(Continued)

OTHER PUBLICATIONS

Japanese office action issued in corresponding application No. 2015165584 dated Jul. 19, 2016.
(Continued)

*Primary Examiner* — Mohammed H Zuberi
(74) *Attorney, Agent, or Firm* — Carter, Deluca, Farrell & Schmidt, LLP (57) ABSTRACT

An information processing apparatus includes a storage unit configured to store, when document data whose storage is designated has been printed, the document data as history document data, a selection unit configured to select new document data that has not yet been printed on a sheet and the history document data stored by the storage unit, and a generation unit configured to generate a combined document by combining the new document data and the history document data selected by the selection unit.

25 Claims, 9 Drawing Sheets

(52) U.S. Cl.
CPC .......... *G06F 17/212* (2013.01); *G06F 3/1219* (2013.01)

(56) References Cited

U.S. PATENT DOCUMENTS

| | | | |
|---|---|---|---|
| 7,225,448 B2 | 5/2007 | Himmel et al. |
| 7,237,005 B2 | 6/2007 | Honda et al. |
| 7,239,412 B2 | 7/2007 | Leslie |
| 7,298,511 B2 | 11/2007 | Lay et al. |
| 7,308,584 B2 | 12/2007 | Himmel et al. |
| 7,310,693 B2 | 12/2007 | Delaplace et al. |
| 7,315,387 B2 | 1/2008 | Nishikawa |
| 7,409,419 B2 | 8/2008 | Iwaishi et al. |
| 7,584,242 B2 | 9/2009 | Ebuchi |
| 7,647,074 B2 | 1/2010 | McCoog et al. |
| 7,652,798 B2 | 1/2010 | Kuo et al. |
| 7,689,578 B2 | 3/2010 | Albornoz et al. |
| 7,689,730 B2 | 3/2010 | Codispoti et al. |
| 7,765,195 B2 | 7/2010 | Miller et al. |
| 7,903,277 B2 | 3/2011 | Cudd et al. |
| 7,916,342 B2 | 3/2011 | Natori |
| 8,065,357 B2 | 11/2011 | Cocotis et al. |
| 8,248,647 B2 | 8/2012 | Izaki |
| 8,325,190 B2 | 12/2012 | Ferlitsch |
| 8,487,961 B2 | 7/2013 | Takami et al. |
| 8,514,438 B2 | 8/2013 | Nishio |
| 8,610,938 B2 | 12/2013 | Seikh et al. |
| 8,749,827 B2 | 6/2014 | Utsunomiya |
| 8,885,181 B2 | 11/2014 | Williams et al. |
| 8,896,859 B2 | 11/2014 | Otsuka |
| 8,934,119 B2 | 1/2015 | McCuen et al. |
| 8,953,181 B2 | 2/2015 | Oba et al. |
| 9,019,532 B2 | 4/2015 | Anand et al. |
| 9,036,185 B2 | 5/2015 | Bhatia et al. |
| 9,110,962 B2 | 8/2015 | Hirai et al. |
| 9,134,941 B2 | 9/2015 | Ishimoto |
| 2002/0046238 A1 | 4/2002 | Estavillo et al. |
| 2003/0172168 A1 | 9/2003 | Mak et al. |
| 2004/0205539 A1 | 10/2004 | Mak et al. |
| 2005/0286100 A1 | 12/2005 | Uotani et al. |
| 2007/0195361 A1 | 8/2007 | Tomomatsu |
| 2008/0117449 A1 | 5/2008 | Lauridsen et al. |
| 2009/0150394 A1 | 6/2009 | Bailor et al. |
| 2009/0262396 A1 | 10/2009 | Furuya |
| 2009/0307274 A1 | 12/2009 | Baer |
| 2009/0313331 A1 | 12/2009 | Rasmussen et al. |

FOREIGN PATENT DOCUMENTS

| | | |
|---|---|---|
| JP | 2001-159961 A | 6/2001 |
| JP | 2006-209708 A | 8/2006 |
| JP | 2006-215805 A | 8/2006 |
| JP | 2006-277056 A | 10/2006 |
| JP | 2007-249859 A | 9/2007 |

OTHER PUBLICATIONS

Japanese Office Action issued in corresponding application No. 2015165584 dated Nov. 22, 2016.

Office Action dated Dec. 17, 2013, in counterpart Japanese Patent Application No. 2009-292771.

INFORMATION PROCESSING APPARATUS, INFORMATION PROCESSING METHOD, AND STORAGE MEDIUM

CROSS REFERENCE TO RELATED APPLICATIONS

This application is a continuation of U.S. patent application Ser. No. 12/969,019, filed on Dec. 15, 2010, which claims the benefit of and priority to Japanese Patent Application No. 2009-292771, filed on Dec. 24, 2009, the entire contents of each of which are hereby incorporated by reference herein in their entireties.

BACKGROUND OF THE INVENTION

Field of the Invention

The present invention relates to an information processing apparatus, an information processing method, and a storage medium.

Description of the Related Art

There is a conventional printer driver having a history printing function for storing a document printed in the past and calling the document at the necessary time to print the document again (Japanese Patent Application Laid-Open No. 2006-209708). Recently, a printing system different from the conventional printing system appears. In the new printing system, as a data format stored in a spool file, a conventional enhanced meta file (EMF) format is not used but an extensible markup language (XML) paper specification format (XPS) is used. The XPS is an electronic document format in an open standard format. In the XPS, each part, e.g., page, has a print ticket (hereinafter, referred to as PT) as XML data in which print setting is described.

The format of the XPS document is opened, and the print data used by the system is relatively easily used. Therefore, an XPS driver using the XPS document can relatively easily edit the print data, and can also perform editing of jobs, e.g., combining jobs.

However, with a technology discussed in Japanese Patent Application Laid-Open No. 2006-209708, a document that was previously printed and stored as a history (hereinafter, referred to as a history document) cannot be used in combination with another document.

SUMMARY OF THE INVENTION

The present invention is directed to an information processing apparatus capable of easily combining a new print document with a history document.

According to an aspect of the present invention, an information processing apparatus includes a storage unit configured to store, when document data whose storage is designated has been printed, the document data as history document data, a selection unit configured to select new document data that has not yet been printed on a sheet and the history document data stored by the storage unit, and a generation unit configured to generate a combined document by combining the new document data and the history document data selected by the selection unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

Figure 1:
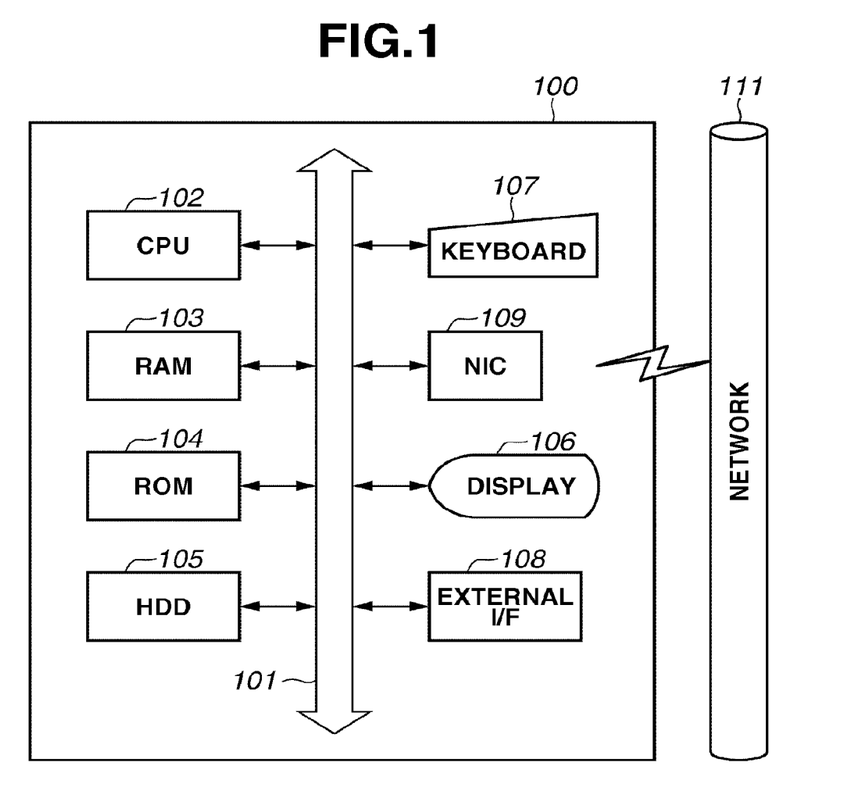
FIG. 1 illustrates an example of a hardware configuration of an information processing apparatus according to an exemplary embodiment of the present invention.

FIG. 1 illustrates an example of a hardware configuration of an information processing apparatus 100 according to an exemplary embodiment of the present invention.

A central processing unit (CPU) 102, a random access memory (RAM) 103, a read only memory (ROM) 104, a hard disk drive (HDD) 105, a network interface card (NIC) 109, a display 106, a keyboard 107, and an external interface (I/F) 108 are connected to each other via a system bus 101. The system bus 101 includes, e.g., a peripheral components interconnect (PCI) bus, an accelerated graphics port (AGP) bus, and a memory bus. The CPU 102 controls the entire apparatus, executes an application program and an OS stored in the HDD 105, and controls temporary storage of information and a file necessary for execution of the program in the RAM 103.

The ROM 104 is an example of a storage unit, and stores a program such as a basic input/output (I/O) program. The RAM 103 is an example of a temporary storage unit, and functions as a main memory or a work area for the CPU 102.

The HDD 105 is an external storage unit and also functions as a large-capacity memory. The HDD 105 may store various programs. The programs also may include the printer driver and the preview control module and the filters according to the present exemplary embodiment. The program may also include an operating system (OS) and an application program (e.g., a printer driver and a preview control module and filters according to the present exemplary embodiment).

The display 106 is an example of a display unit, and displays a command input from the keyboard 107 or document information stored on a print document management system.

The external I/F 108 connects an information forming apparatus, a USB device, or a peripheral device.

The keyboard 107 is an example of an instruction input unit.

The network interface card (NIC) 109 receives and transmits data from/to another device (external device) included in the print document management system via a network 111.

The hardware configuration is an example thereof, and is not limited to the configuration example illustrated in FIG. 1. The storage destination of data or a program can be changed to the ROM, RAM, or HDD depending on features thereof. Any reference to the term program herein is synonymous with computer-executable instructions and these two identifications can be used interchangeably.

The CPU 102 executes the program, thereby realizing a function (or software structure) of the information processing apparatus 100. A history document, which will be described below, is stored in a storage area of the RAM 103 or the HDD 105 as an example of the storage device.

Figure 2:
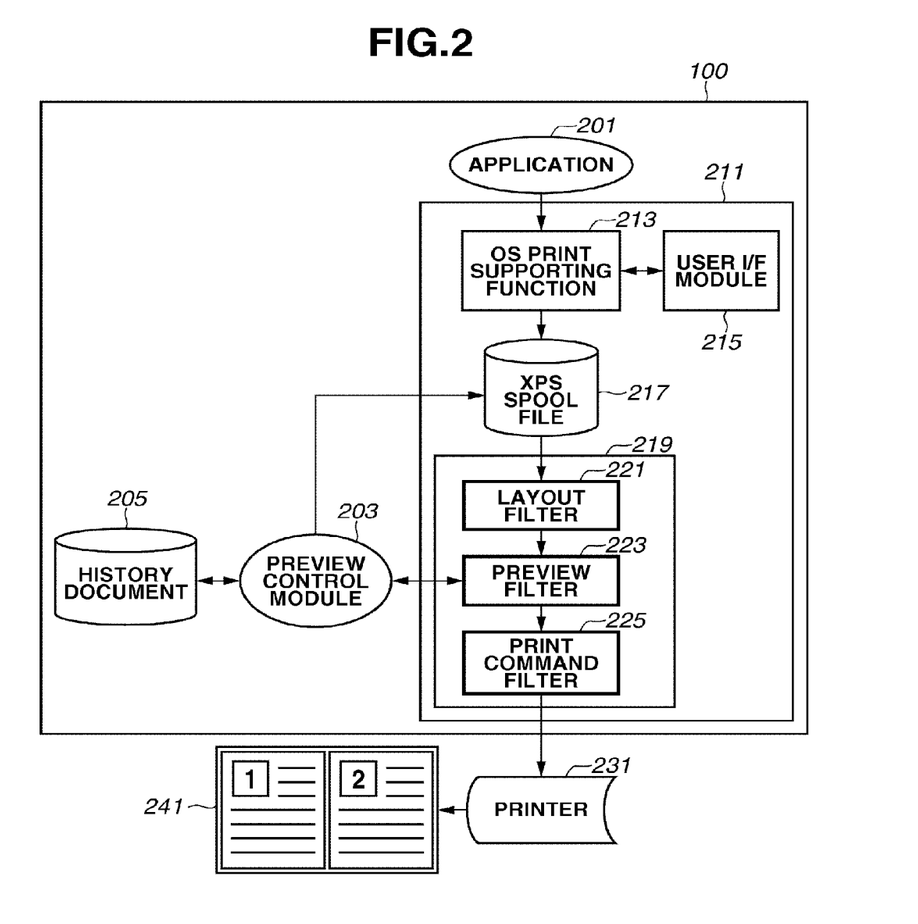
FIG. 2 illustrates a schematic block diagram of a functional configuration of the information processing apparatus.

FIG. 2 is a block diagram conceptually illustrating a functional configuration of the information processing apparatus 100. Modules according to the following exemplary embodiments including the present exemplary embodiment include a user interface module 215 having a print setting function, filters 219, and a preview control module 203. The filters 219 include a layout filter 221 having a function for layout processing of a page in the XPS document and a preview filter 223 as a filter for providing a preview function. The filters 219 further include a print command filter 225 having a function for converting the XPS document into a printer-interpretable print command. The filter indicates an application (program) having a function for outputting some data via steps of processing, conversion, non-conversion, and generation based on generally input data.

In the printing system in FIG. 2, data in pages of a document created by an application 201 is temporarily stored in an XPS spool file 217 as the XPS document via an OS print support function 213. Via the filters 219 of the printer driver, the temporarily stored XPS document is converted into a print command that can be interpreted by the printer based on the print setting information, and is supplied to a printer 231, thereby executing printing processing.

The user interface module 215 generally provides a function for setting the sheet size used for printing, the print direction, and another attribute. Simultaneously, the user interface module 215 has a function for setting the preview for display controlling a print image before starting the print operation using the printer. The user interface module 215 returns the print setting information for storing setting values of a plurality of print setting items to the application 201.

The application 201 notifies the OS print support function 213 of print start or print end or the print setting information returned from the user interface module 215 for the print setting when printing a created arbitrary document. The application 201 notifies the start or end of drawing of pages in the document. The OS print support function 213 stores contents drawn by the application or the print setting information in the XPS spool file 217. The filters 219 are called from the OS print support function 213 when despooling the spooled XPS document.

The filters 219 of the printer driver include at least one filter and have a function for reading the XPS document from the XPS spool file during printing, converting the XPS document into a printer-interpretable print command, supplying the converted XPS document to the printer 231, and printing the XPS document. The filters 219 according to the present exemplary embodiment include the layout filter 221 having a layout function, the preview filter 223 having a preview document creating function, and the print command filter 225 having a print command converting function. However, the layout function and the preview function can be realized by one filter, or an unnecessary filter can be removed, and the present exemplary embodiment is not limited to the above-described filter configuration.

The layout filter 221 has a function for receiving the XPS document stored in the XPS spool file 217, performing layout processing of the page based on the print setting information, and outputting the layout XPS document. The layout processing according to the present exemplary embodiment includes N-up printing for printing a plurality of pages on one sheet surface, or poster printing for printing one page on a plurality of sheet surfaces.

The preview filter 223 includes the preview control module 203 for providing a preview image to the user based on the layout XPS document output from the layout filter 221. The operation of the preview filter 223 is described below with reference to FIG. 3.

The preview function according to the present exemplary embodiment can use a plurality of XPS documents. Therefore, when one XPS document is added to the preview control module 203, sequential processing of the XPS document is not performed and ends once. Thus, processing of the next XPS document starts, and a plurality of XPS documents can be added to the preview control module 203. In the preview control module 203, the history document 205 is added to a job list, thereby printing or editing (combining) the documents. When the user, who checks the preview, instructs the printing, the preview control module 203 adds the XPS document whose printing is instructed to a print queue. The preview control module 203 sets OFF the preview setting of the added XPS document. Thus, the preview filter 223 sends the XPS document to the next print command filter 225 without re-preview. The preview control module 203 stores the printed XPS document as the history document 205 according to the necessity during printing.

The print command filter 225 converts the XPS document into a printer-interpretable print command according to the XPS document and the print setting information output from the preview filter 223, and outputs the converted XPS document. When converting the input XPS document into image data once, the print command filter 225 is called a render filter. The render filter is used for an inexpensive printer driver for a raster printer, typically such as an inkjet printer in many cases. When the print command filter 225 operates as the render filter, the input XPS document is converted into image data once. The image data is thereafter subjected to image processing such as color space conversion or binarization, and is converted into a print command that can be interpreted by a raster printer. In an increased function printer, represented by a page printer, if the XPS is included in the type of printer-interpretable print command, the print command filter 225 edits an input XPS document and outputs the edited XPS document. When the processing is not required by the print command filter 225, the print command filter 225 outputs an input XPS document without change. When the processing is not required by the print command filter 225, the printer driver may not include the print command filter 225.

The printer 231 as an output device has a function for interpreting the print command generated by the print command filter 225 and forming a visible image on a print sheet. An example of a print result illustrated on a print sheet 241 indicates 2-up processing by the layout filter 221.

Figure 3:
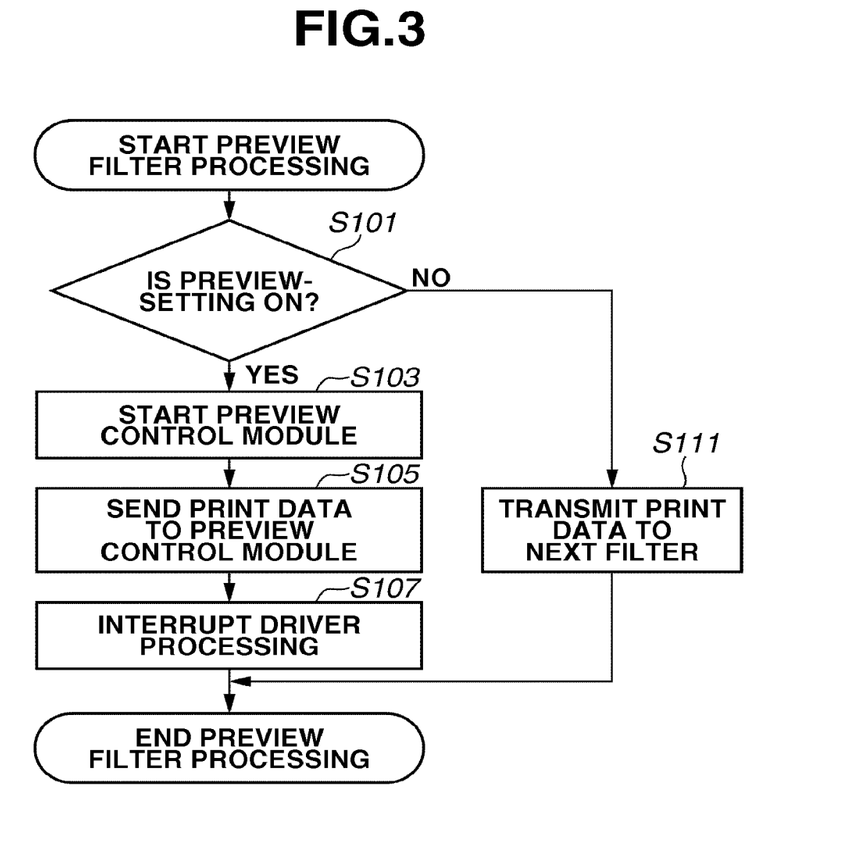
FIG. 3 illustrates an example of processing by a preview filter.

FIG. 3 illustrates an example of a flowchart for processing by the preview filter 223. Steps in the present flowchart are realized by reading a corresponding program from a memory and executing the read program by the CPU 102.

In step S101, the preview filter 223 determines whether the preview setting of the XPS document in progress of the processing is ON. When the preview setting is ON in step S101 (YES in step S101), the preview filter 223 proceeds to processing in step S103. When the preview setting is OFF in step S101 (NO in step S101), the preview filter 223 proceeds to processing in step S111. In step S103, the preview filter 223 starts the preview control module 203, and proceeds to processing in step S105. In step S105, the preview filter 223 transmits the XPS document from the preview filter 223 to the preview control module 203, and proceeds to processing in step S107. The preview control module 203 performs the preview by displaying the XPS document. In step S107, the preview filter 223 cancels the XPS document in progress of processing, and interrupts the processing of a driver including another filter. Thus, the XPS document is deleted from the print queue, and the processing of the next XPS document thus becomes possible. In step S111, the preview filter 223 does not perform the preview, and transmits the XPS document to the next filter. After ending the transmission of all XPS documents, the preview filter 223 ends the processing illustrated in FIG. 3.

Figure 4:
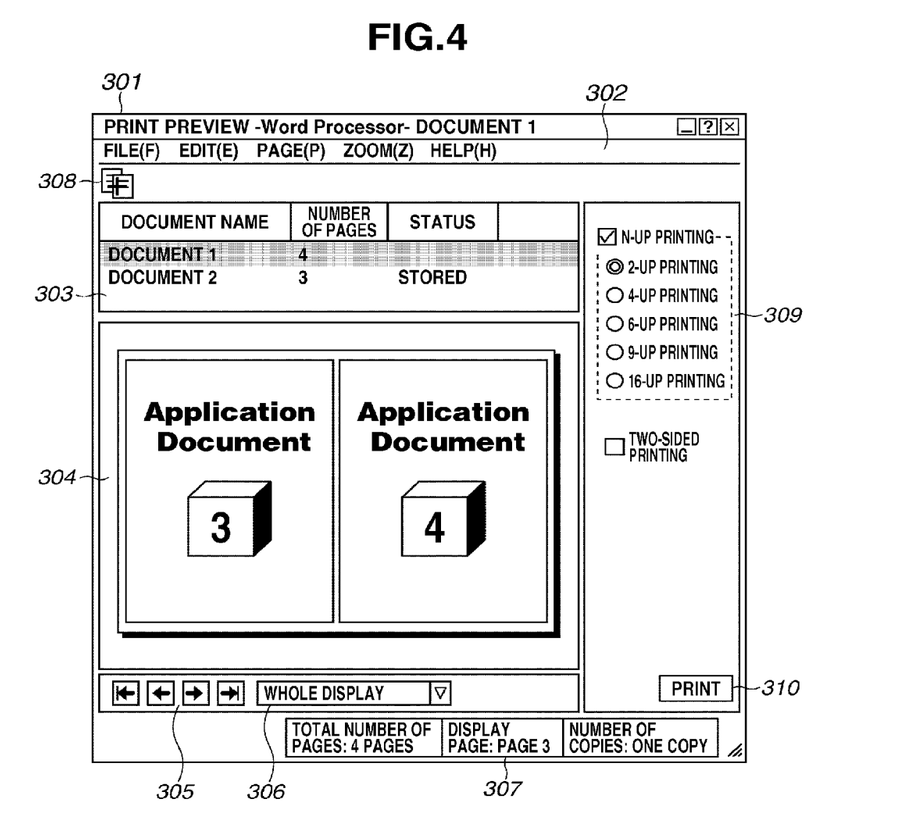
FIG. 4 illustrates an example of a preview window provided by a preview control module.

FIG. 4 illustrates an example of a display screen (preview window) provided by the preview control module 203. A print preview window 301 as an example of a print preview screen includes a display area for displaying a preview image or print setting information of the XPS document, and an input unit for changing a display method of the preview image by the user. A menu bar 302 is used to select a command for switching the display to a previewer in a menu format. The job list 303 is an example of document data including a new print document and a history document as the print document whose printing is already executed displayed in a preview display area. According to the present exemplary embodiment, both the print document and the history document are XPS documents. The preview control module 203 displays a list of the processable documents in the job list 303. The document selected in the job list 303 is a target for display and printing. The history document is displayed on the job list 303, similarly to a new print document. In order to display the history document, "stored" is expressed in a status column of the job list 303. The preview control module 203 switches display and non-display of the history document in response to a display switch instruction from the user (display switching).

The preview control module 203 displays, on a preview display area 304, the print sheet and a visible image that is expected to be formed on the print sheet by using contents of the XPS document for preview, as a print image. The user operation units 305 and 306 are provided for a tool bar. The user can easily instruct the switching of a preview page by pressing the tool bar without using a menu bar 302. A page switching button 305 includes four buttons. The user can instruct the switching of the preview display to a head page, a previous page, a next page, and a final page with the buttons. A drop down list 306 is used when changing the display size of the preview image. The user instructs the selection of the whole display, 100% display, or 200% display with the drop down list 306. A display area 307 displays a setting value of a typical setting item on the print setting information of the preview-displayed XPS document. Referring to FIG. 4, the total number of pages in the document is 4, and the page number preview-displayed is 3. FIG. 4 illustrates an example in which the number of copies set by the print setting information is 1.

The user can press a combining button 308 as an example of an editing object for instructing the editing of the document while selecting a plurality of XPS documents in the job list 303, thereby combining a plurality of selected XPS documents. With the processing, the combined document is generated. The user can change the print setting information of the XPS document selected by the job list in the print setting changing area 309. In the example in FIG. 4, N-up printing for arranging a plurality of pages on one sheet and two-sided printing can be set, and another setting item can be however arranged. A print setting changing area 309 (or a check box or a radio button disposed in the print setting changing area 309) is an example of the editing object for instructing the editing of the document.

Since a document 1 is selected in FIG. 4, the change of setting is applied to the document 1, and is not applied to a document 2 as the history document.

The user presses a print button 310, thereby starting the printing of the XPS document selected from the job list 303.

According to the present exemplary embodiment, the XPS document with the print setting information indicating that the preview setting is ON is spooled, and a print support function of the OS starts a filter pipe line. When the printer driver starts the preview control module 203, the display screen illustrated in FIG. 4 as an example is displayed. However, when the preview control module already starts, the XPS document with the print setting information indicating that the preview setting is ON is supplied to the existing preview control module 203, and the supplied XPS document is displayed on the job list 303.

The display screen illustrated in FIG. 4 as an example can directly start, without involving the printer driver, to print the history document. In this case, the display of the history document is ON in the initial state, and the history document stored at the start time is displayed on the job list 303. Even if the display screen is directly started, when the XPS document with the print setting information indicating the preview setting is ON is issued during starting the display screen, the XPS document is supplied to the preview control module, which is starting, and is displayed on the job list 303.

Figure 5:
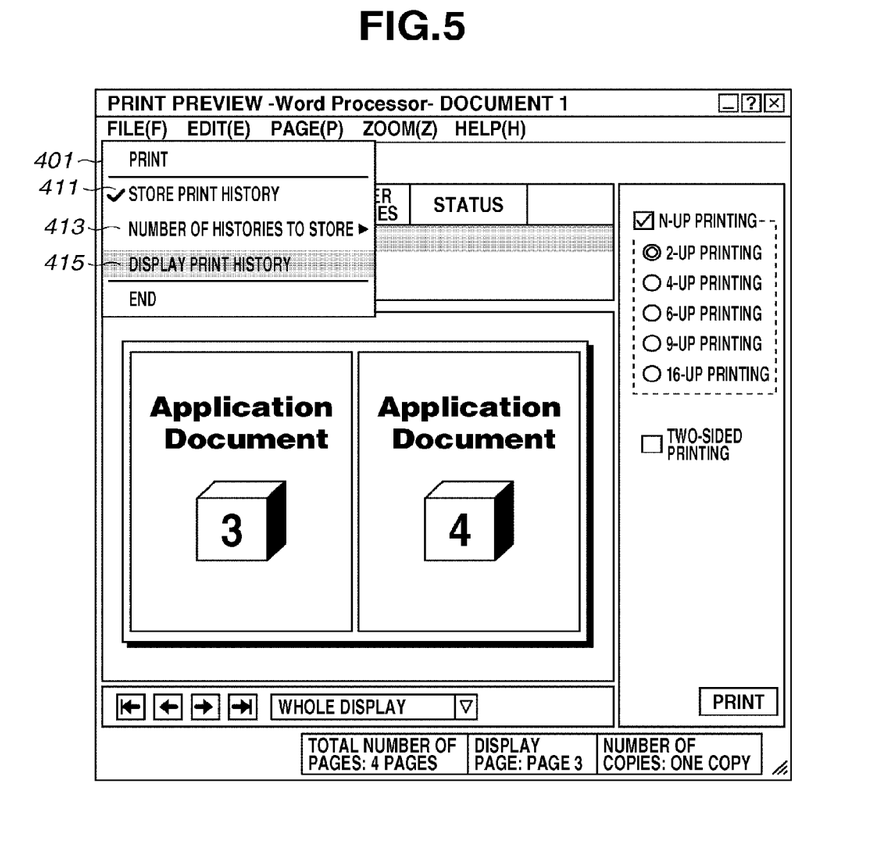
FIG. 5 illustrates an example of an operation for setting a print history function on a print preview window.

FIG. 5 illustrates an example of an operation for setting a print history function on the print preview window 301. When the user selects the file menu from the menus, a file menu list 401 is displayed. As an item on the history function, there are "store the print history", "the number of histories to store", and "display print history". The user can set a "store the print history" menu 411 for determining whether the document printed from the preview is stored as the history document. Every time when the user presses the menu, ON/OFF is switched. When setting the storage, a check mark is added to the side of the menu. The storage is performed at the print time, and the XPS document reflecting editing contents in the preview control module 203 is stored as the history document. When simply printing the history document, the same document is already stored and is not, therefore, stored again. However, only information on the history storage period is updated. A "the number of histories to store" menu 413 is used to set the upper limit number of storable history documents by the user. When the number of history documents exceeds the upper limit number of storable history documents at the storage time, the history document is deleted in the order of earliest. When the user presses "the number of histories to store" menu 413, a list of selectable stored history documents (not illustrated) is displayed, and when the user selects the number of stored history document from the list, the number of storable history documents is determined.

A "display print history" menu 415 is used by the user to set whether to display the history document on the job list 303. Each time the menu is pressed, the ON/OFF is switched. When the display is set, a check mark is added to the side of the menu. When the display of the print history is ON, the preview control module 203 calls the history document 205 and displays the history document 205 on the job list 303. Addition processing of the history document is described below with reference to FIG. 7. On the other hand, when the display of the print history is OFF, the history document is deleted from the displayed job list 303.

The user can edit or print the history document added to the job list, similar to the new document. When user selects the new document and the history document and presses the combining button 308, the preview control module 203 can generate a combined document from the new document and the history document. The editing is performed including the combination, and the history document whose the print setting is changed is different from the stored document. Therefore, the document after the editing is used as a new document. Therefore, from the edited history document, the description "stored" in a status column of the job list 303 is deleted, and the history document becomes an object to be stored for printing.

According to the present exemplary embodiment, the description is given of the method for changing the setting on the print history depending on the menu. The setting or display can be switched (display switching) by another method such as using a history display button.

According to the present exemplary embodiment, the start of the preview control module 203 includes two methods. According to the first method, the printing is performed with the ON preview-setting on the setting screen of the printer driver from the application. According to the second method, an icon of the preview control module displayed on the start menu is set by the user to print the history document.

Figure 6:
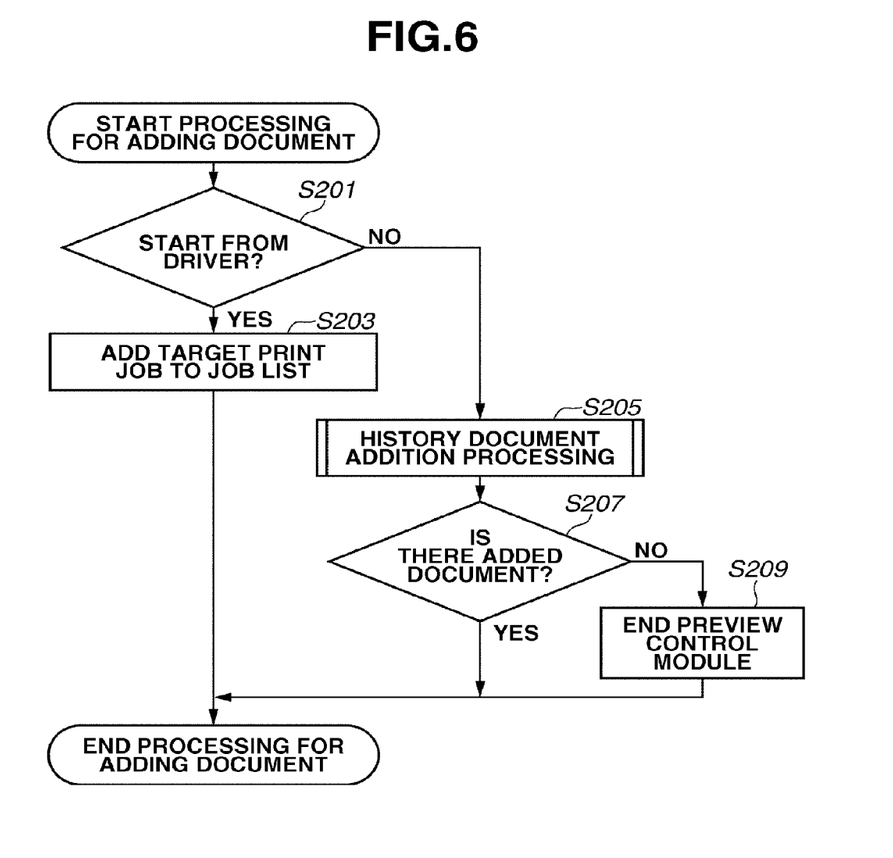
FIG. 6 illustrates a flowchart of an example of start processing of the preview control module.

FIG. 6 illustrates a flowchart of an example of the start processing of the preview control module 203. In step S201, the preview control module 203 determines which of the two start methods is used for the preview control module 203. When the preview control module 203 is started from the printer driver during printing from the application, the preview control module 203 proceeds to processing in step S203. When the preview control module 203 is directly started (the preview control module 203 is started from other than the printer driver), the preview control module 203 proceeds to processing in step S205. When the preview control module 203 is started from the preview filter 223, the preview control module 203 receives the XPS document from the preview filter 223. A description is given of a specific determination method in step S201. When receiving the XPS document from the preview filter 223, the preview control module 203 determines that the preview control module 203 is started from the printer driver. When receiving no XPS documents at the start time, the preview control module 203 determines that the preview control module 203 is directly started. Alternatively, the preview control module 203 may determine a start mode depending on the difference in start parameters (arguments transmitted at the start time). The "directly started" means that the start menu displays a character string or an icon corresponding to the preview control module 203 and the user selects the character string or icon to start the preview control module 203.

Step S203 corresponds to processing when the preview control module 203 is started from the printer driver. In step S203, the preview control module 203 receives the XPS document created by printing from the application from the filter, and adds the received XPS document as a processable document to the job list 303.

The processing in steps S205 to S209 corresponds to processing when the preview control module 203 is directly started. In step S205, the preview control module 203 performs the addition processing of the history document, and proceeds to processing in step S207. The addition processing of the history document is described below with reference to FIG. 7. In step S207, the preview control module 203 determines whether there is any document added to the job list 303 in the addition processing of the history document in step S205. When there is no document added to the job list 303 (NO in step S207), the preview control module 203 proceeds to processing in step S209. When there is a document added to the job list 303 (YES in step S207), the start processing of the preview control module 203 ends. In step S209, the processing of the preview control module 203 ends because there are not any displayable documents in the preview control module 203. In this case, to enable the user to recognize an end reason, the preview control module 203 displays a message for the user indicating that there is not an available history document.

According to the present exemplary embodiment, the history display is OFF in the initial state at the start time for printing. However, the history display can be set ON. The information processing apparatus 100 may have a function for setting ON/OFF of the history display at the start time by the user.

Figure 7:
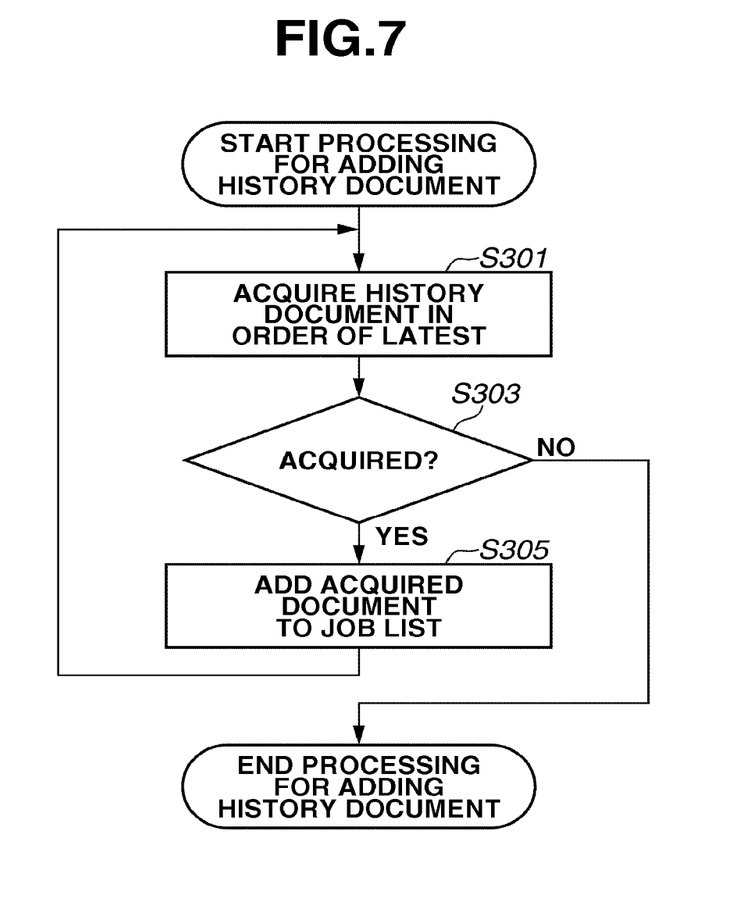
FIG. 7 illustrates a flowchart of an example of display processing of a history document.

FIG. 7 illustrates a flowchart of an example of display processing (in step S205 in FIG. 6) of the history document. In step S301, the preview control module 203 acquires the stored history documents in order of latest, and proceeds to processing in step S303. In step S303, the preview control module 203 determines whether the history document has been acquired in step S301. When the preview control module 203 determines in step S303 that the history document has been acquired (YES in step S303), the preview control module 203 proceeds to processing in step S305. When the preview control module 203 determines in step S303 that the history document has not been acquired (NO in step S303), the addition processing of the history document ends. In step S305, the preview control module 203 registers the acquired history document to be available with the preview control module 203, and adds the registered history document to the job list 303. In this case, the preview control module 203 displays "stored" to indicate the history document in a status column of the job list 303. When, in step S305, the addition processing of the history document ends, the preview control module 203 returns to step S301, in which the preview control module 203 acquires the latest document from the unprocessed history documents. The preview control module 203 repeats the processing, thereby adding all of the stored history documents to the preview control module 203. When it is determined in step S303 that all of the history documents are added to the preview control module 203 and there are not any unprocessed history documents (NO in step S303), the preview control module 203 ends the addition processing of the history document.

Figure 8:
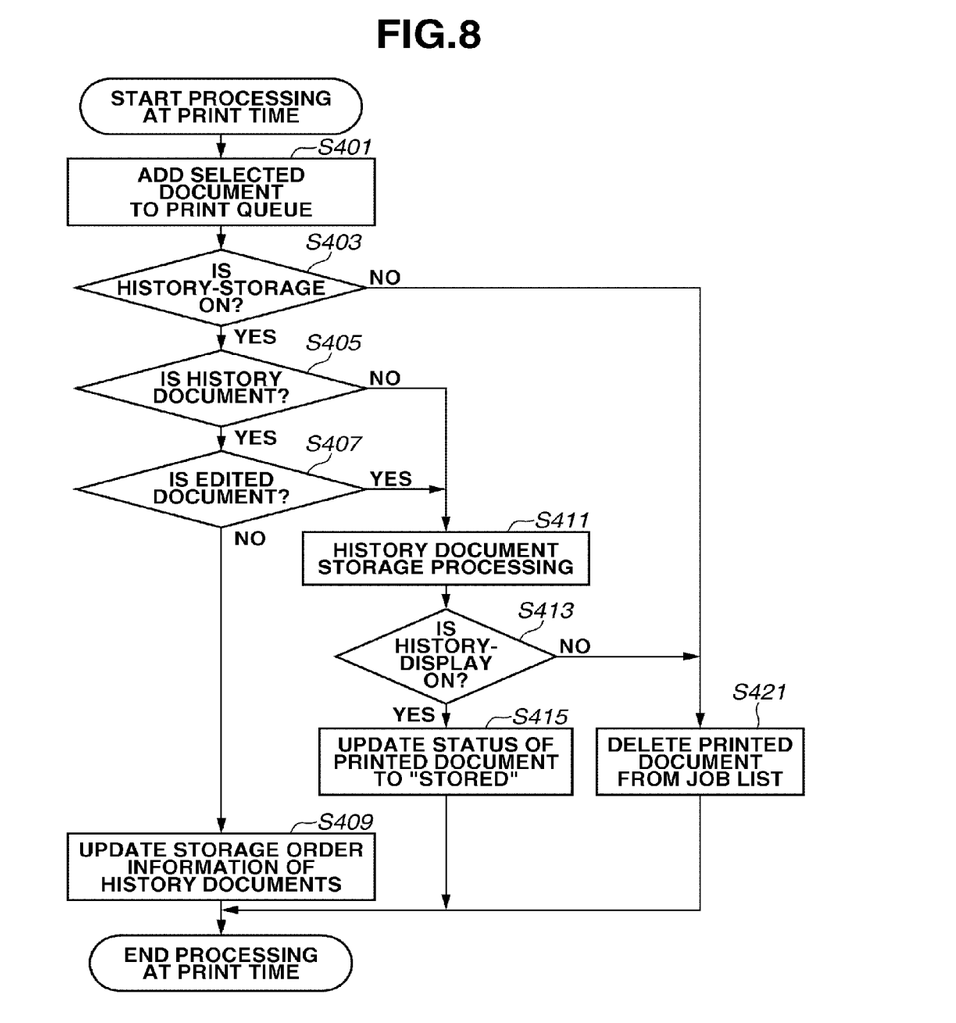
FIG. 8 illustrates an example of processing during printing via a preview window.

FIG. 8 illustrates an example of processing for printing data from the preview window. In step S401, the preview control module 203 adds the XPS document selected as a print target by the user to the print queue, and proceeds to processing in step S403. Since the XPS document according to the present exemplary embodiment is currently used as processing data, the XPS document is added to the print queue, thereby printing the XPS document. In this case, the preview control module 203 sets OFF the preview setting, thereby preventing the preview again. This can be realized by adding information indicating execution of preview to a target XPS document, and determining whether the XPS document is the previewed document with the filter. When processed data in the preview control module is in a format different from the XPS document, the data needs to be converted into the XPS document.

In step S403, the preview control module 203 determines whether the storage setting of the history is ON. When the storage setting of the history is ON in step S403 (YES in step S403), the preview control module 203 proceeds to processing in step S405. When the storage setting of the history is OFF in step S403 (NO in step S403), the preview control module 203 proceeds to processing in step S421. In step S405, the preview control module 203 determines whether the printed document is the history document. When the printed document is the history document in step S405 (YES in step S405), the preview control module 203 proceeds to processing in step S407. When the printed document is not the history document in step S405 (NO in step S405), the preview control module 203 proceeds to processing in step S411. In the processing for determining whether the document is the history document, the preview control module 203 stores information indicating whether data as a print target is read as the history document. When the data as a print target is the read data, the data is determined as the history document.

In step S407, the preview control module 203 determines whether the history document is edited. Specifically, when the print ticket of the history document is changed at the print time, the preview control module 203 determines that the history document is edited.

When the history document is not edited (NO in step S407), the preview control module 203 proceeds to processing in step S409. When the history document is edited and the stored history document is set differently from that at the print time (YES in step S407), the preview control module 203 proceeds to processing in step S411. In step S409, since the preview control module 203 has already printed the stored history document, the preview control module 203 updates information on the storage order of the printed history documents, and ends the processing at the print time. The preview control module 203 deletes the history document in the order of earliest when the number of the history documents exceeds an allowable number stored documents. Therefore, when printing the history document, the preview control module 203 updates the information on the storage order, and sets the printed history document as the latest history.

In step S411, the preview control module 203 stores the printed document as the history document, and proceeds to processing in step S413. With the determination in steps S405 and S407, the already-stored document is not over-lappingly stored. In step S413, the preview control module 203 determines whether the history display is ON. When the history display is ON in step S413 (YES in step S413), the preview control module 203 proceeds to processing in step S415. When the history display is OFF in step S413 (NO in step S413), the preview control module 203 proceeds to processing in step S421. In steps S415 and S421, the preview control module 203 updates the job list 303. In step S415, the preview control module 203 stores the printed document as the history, and the history display is ON. Therefore, the preview control module 203 does not delete the printed document from the job list 303, and keeps the printed document as the history document on the job list 303. In this case, the preview control module 203 updates a status column of the job list 303 to "stored" indicating the history document. In step S421, the preview control module 203 is set not to store the history, or not to display the history document. Therefore, the preview control module 203 deletes the printed document from the job list 303. When updating of the job list 303 is completed, the preview control module 203 ends the processing at the print time.

The processing according to the above-described exemplary embodiment enables the processing of the history document on the print preview. However, the preview control module 203 stores the history, and only the previewed document is stored as the history. Then, according to another exemplary embodiment, in addition to the method according to the above-described exemplary embodiment, a method for storing the history of a document that is not previewed is proposed by storing the history with the filter.

Figure 9:
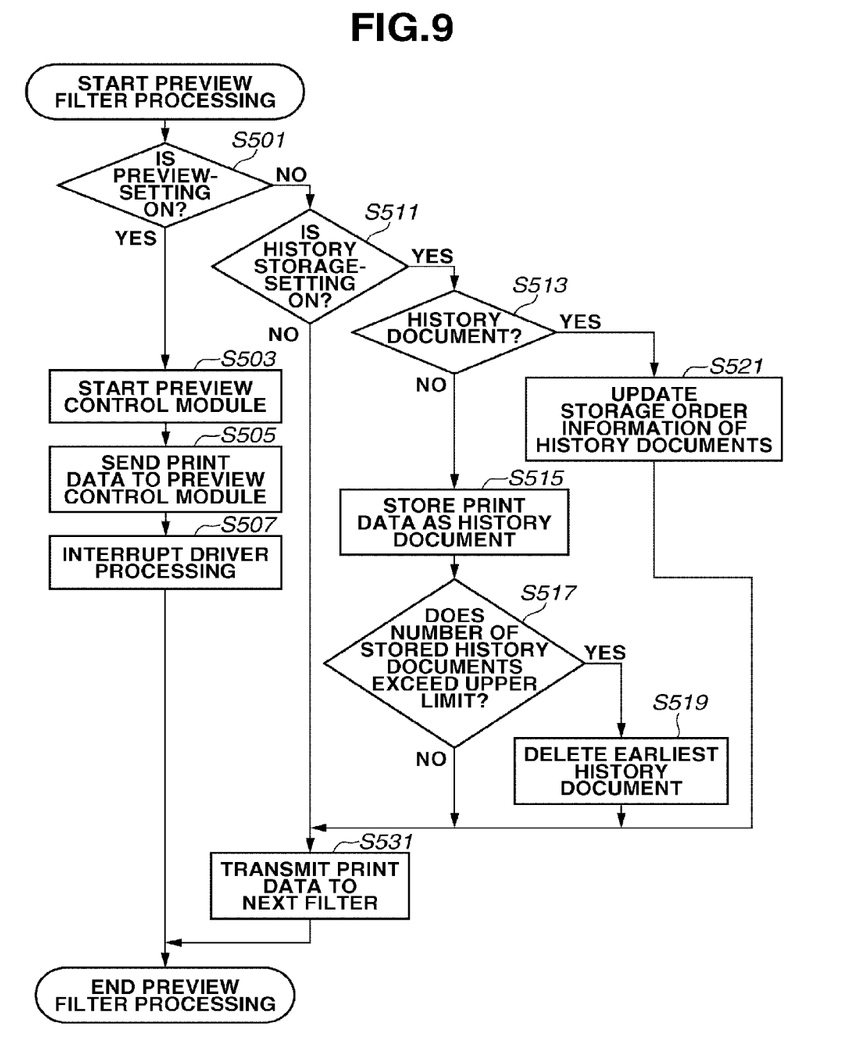
FIG. 9 illustrates a flowchart of an example of preview filter processing having a history storing function.

FIG. 9 illustrates a flowchart of an example of the preview filter processing having the history storing function. In step S501, the preview filter 223 determines whether the preview setting of the document in progress of the processing is ON. When the preview setting of the document in progress of the processing is ON (YES in step S501), the preview filter 223 proceeds to processing in step S503. When the preview setting of the document in progress of the processing is OFF (NO in step S501), the preview filter 223 proceeds to processing in step S511. Since the processing in steps S503 to S507 when the preview setting is ON is similar to the processing in steps S103 to S107 using the preview filter 223 according to the above-described exemplary embodiment, a description thereof is not repeated.

In step S511, the preview filter 223 determines whether the storage setting of the history is ON. When the storage setting of the history is ON (YES in step S511), the preview filter 223 proceeds to processing in step S513. When the storage setting of the history is OFF (NO in step S511), the preview filter 223 proceeds to processing in step S531. The storage setting of the history is designated with a setting screen (a screen displayed before the screen illustrated in FIG. 4 is displayed) of the printer driver. In step S513, the preview filter 223 determines whether the document in progress of the processing is the history document. When the document in progress of the processing is not the history document (NO in step S513), the preview filter 223 proceeds to processing in step S515. When the document in progress of the processing is the history document (YES in step S513), the preview filter 223 proceeds to processing in step S521. The preview control module 203 needs to store information indicating that a target document is the history document so that the preview filter 223 determines whether a target document is the history document. As a method for storing information from the preview at the print time, a method for describing the information in the print ticket (PT) can be considered. Alternatively, the information may be stored at any place readable by the filter.

Steps S515 to S519 correspond to processing of the document that is not the history. The document in progress of the processing is stored as the history document. Since the history document that is edited with the setting different from that at the storage time is not used as the history document, the document is stored as the history document. In step S515, the preview filter 223 stores the document in progress of the processing as the history document, and proceeds to processing in step S517. In step S517, the preview filter 223 determines whether the number of the stored history documents exceeds the upper limit of the storable number of the history documents when storing the history document in step S515. When the number of the stored history documents exceeds the upper limit of the storable number of the history documents (YES in step S517), the preview filter 223 proceeds to processing in step S519. When the number of the stored history documents does not exceed the upper limit of the storable number of the history documents (NO in step S517), the preview filter 223 proceeds to processing in step S531. In step S519, the preview filter 223 deletes the earliest document in the storage period of the history documents, and proceeds to processing in step S531.

Step S521 corresponds to processing of the history document. Therefore, since the document in progress of the processing is already stored as the history document, the preview filter 223 does not additionally store the history document. In step S521, the preview filter 223 updates information on the storage order of the history documents, and proceeds to processing in step S531. Since the processing in step S521 is similar to that in step S409, a description thereof is not repeated.

In step S531, the preview filter 223 transmits the print data to the next filter, and ends the processing of the preview filter.

According to the present exemplary embodiment, the document that is printed without the preview can be stored as the history. According to the present exemplary embodiment, the document that is printed is stored with a preview filter. A filter applicable for the storage varies depending on the difference in the filter configuration or operation of the filters, and the history document can be stored by another filter.

According to the above-described exemplary embodiments of the present invention, a new print document can be easily combined with a history document.

The present invention can be realized by executing the following processing. Software (program) for realizing the function according to the exemplary embodiments is supplied to a system or apparatus via a network or storage mediums, and a computer (or a CPU or a micro processing unit (MPU)) in the system or apparatus reads and executes the program.

According to the above-described exemplary embodiments, only by performing print preview during execution of printing, the user is enabled to edit a print history. Thus, the user can combine a new print job with the history document. In other words, the user can easily edit the new print document and the history document with the same application. As described above, the editing includes changing of a print setting, editing of a page, and combining of documents.

Aspects of the present invention can also be realized by a computer of a system or apparatus (or devices such as a CPU or MPU) that reads out and executes a program recorded on a memory device to perform the functions of the above-described embodiment (s), and by a method, the steps of which are performed by a computer of a system or apparatus by, for example, reading out and executing a program recorded on a memory device to perform the functions of the above-described embodiment (s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-292771 filed Dec. 24, 2009, which is hereby incorporated by reference herein in its entirety.

What is claimed is:

1. An information processing apparatus comprising:
a display control unit configured to cause a display unit to display a preview screen including identification information of document data and a preview image of the document data;
a selection unit configured to select a storage function based on a user operation using the preview screen being performed by the user; and
an accepting unit configured to accept a print instruction based on a user operation using a print item in the preview screen being performed by the user,
wherein in a case where the storage function is selected, the identification information of the document data is displayed in the preview screen after print processing for the document data has been performed, and in a case where the storage function is not selected, the identification information of the document data is not displayed in the preview screen after print processing for the document data has been performed,
wherein in a case where (1) target identification information is selected, based on a user operation to select the target identification information using the preview screen being performed by the user, from the preview screen including as the identification information first identification information of first document data for which print processing is to be newly performed and second identification information of second document data for which the storage function is selected and print processing has been already performed and (2) print setting information is changed, print setting information of document data corresponding to the selected target identification information is changed and print setting information of document data corresponding to the identification information not selected is not changed,
wherein the preview image of the document data corresponding to the selected target identification information is displayed in the preview screen and the preview image of the document data corresponding to the identification information not selected is not displayed in the preview screen, and
wherein printing based on the document data corresponding to the selected target identification information is performed and printing based on the document data corresponding to the identification information not selected is not performed, in a case where the target identification information is selected from the first and second identification information and the print instruction is accepted in a state the first and second identification information are displayed in the preview screen.

2. The information processing apparatus according to claim 1, wherein the preview screen is started via a printer driver that generates printing data.

3. The information processing apparatus according to claim 2, wherein the printer driver generates printing data based on data of an extensible markup language paper specification format (XPS format).

4. The information processing apparatus according to claim 1, wherein in a case where a first mode is selected, the second identification information is displayed on the preview screen and, in a case where a second mode is selected, the second identification information is not displayed on the preview screen.

5. The information processing apparatus according to claim 1, further comprising a generating unit configured to generate a combined document based on the first and second document data.

6. The information processing apparatus according to claim 1, wherein the preview screen includes a setting area for setting the print setting information.

7. The information processing apparatus according to claim 6, wherein the setting area receives N-up printing for arranging a plurality of pages on one sheet and two-sided printing.

8. An information processing method executed by an information processing apparatus, the information processing method comprising:
   causing a display unit to display a preview screen including identification information of document data and a preview image of the document data;
   selecting a storage function based on a user operation using the preview screen being performed by the user; and
   accepting a print instruction based on a user operation using a print item in the preview screen being performed by the user,
   wherein in a case where the storage function is selected, the identification information of the document data is displayed in the preview screen after print processing for the document data has been performed, and in a case where the storing function is not selected, the identification information of the document data is not displayed in the preview screen after print processing for the document data has been performed,
   wherein in a case where (1) target identification information is selected, based on a user operation to select the target identification information using the preview screen being performed by the user, from the preview screen including as the identification information first identification information of first document data for which print processing is to be newly performed and second identification information of second document data for which the storage function is selected and print processing has already been performed and (2) print setting information is changed, print setting information of document data corresponding to the selected target identification information is changed and print setting information of document data corresponding to identification information not selected is not changed,
   wherein the preview image of the document data corresponding to the selected target identification information is displayed in the preview screen and the preview image of the document data corresponding to the identification information not selected is not displayed in the preview screen, and
   wherein printing based on the document data corresponding to the selected target identification information is performed and printing based on the document data corresponding to the identification information not selected is not performed, in a case where the target identification information is selected from the first and second identification information and the print instruction is accepted in a state the first and second identification information are displayed in the preview screen.

9. The information processing method according to claim 8, further comprising starting the preview screen via a printer driver that generates printing data.

10. The information processing method according to claim 9, wherein the printer driver generates the printing data based on data of an extensible markup language paper specification format (XPS format).

11. The information processing method according to claim 8, wherein in a case where a first mode is selected, the second identification information is displayed on the preview screen and, in a case where a second mode is selected, the second identification information is not displayed on the preview screen.

12. The information processing method according to claim 8, further comprising generating a combined document based on the first and second document data.

13. The information processing method according to claim 8, wherein the preview screen includes a setting area for setting the print setting information.

14. The information processing method according to claim 13, wherein the setting area receives N-up printing for arranging a plurality of pages on one sheet and two-sided printing.

15. An information processing method executed by an information processing apparatus comprising:
   causing a display unit to display a preview screen including identification information of document data and a preview image of the document data;
   selecting a storage function based on a user operation using the preview screen being performed by a user; and
   accepting a print instruction based on a user operation using a print item in the preview screen being performed by the user,
   wherein in a case where the storage function is selected, the identification information of the document data is displayed in the preview screen after print processing for the document data has been performed, and in a case where the storage function is not selected, the identification information of the document data is not displayed in the preview screen after print processing for the document data has been performed,
   wherein in a case where (1) target identification information is selected, based on a user operation to select the target identification information using the preview screen being performed by the user, from the preview screen including as the identification information first identification information of first document data for which print processing is to be newly performed and second identification information of second document data for which the storage function is selected and print processing has already been performed and (2) print setting information is changed, print setting information of document data corresponding to the selected target identification information is changed and print setting information of document data corresponding to identification information not selected is not changed,
   wherein the preview image of the document data corresponding to the selected target identification information is displayed in the preview screen and the preview image of the document data corresponding to the identification information not selected is not displayed in the preview screen, wherein printing based on the document data corresponding to the selected target identification information is performed and printing based on the document data corresponding to the identification information not selected is not performed in a case where the target identification information is selected from the first and second identification information and the print instruction is accepted in a state the first and second identification information is displayed in the preview screen, and wherein the preview screen is displayed in a case where preview function is selected via a screen provided by a printer driver generating printing data from data of an extensible markup language paper specification format (XPS format).

16. The information processing method according to claim 15, further comprising starting the preview screen via a printer driver that generates printing data.

17. The information processing method according to claim 16, wherein the printer driver generates the printing data based on data of an extensible markup language paper specification format (XPS format).

18. The information processing method according to claim 15, further comprising generating a combined document based on the first and second document data.

19. The information processing method according to claim 15, wherein the preview screen includes a setting area for setting the print setting information.

20. The information processing method according to claim 19, wherein the setting area receives N-up printing for arranging a plurality of pages on one sheet and two-sided printing.

21. An information processing method executed by an information processing apparatus, the information processing method comprising:
    causing a display unit to display a preview screen including identification information of document data and a preview image of the document data;
    selecting a storage function based on a user operation using the preview screen being performed by a user; and
    accepting a print instruction based on a user operation using a print item in the preview screen being performed by the user,
    wherein in a case where the storage function is selected, the identification information of the document data is displayed in the preview screen after print processing for the document data has been performed, and in a case where the storing function is not selected, the identification information of the document data is not displayed in the preview screen after print processing for the document data has been performed,
    wherein in a case where (1) target identification information is selected, based on a user operation to select the target identification information using the preview screen being performed by the user, from the preview screen including as the identification information first identification information of first document data for which print processing is to be newly performed and second identification information of second document data for which the storage function is selected and print processing has already been performed and (2) print setting information is changed, print setting information of document data corresponding to the selected target identification information is changed and print setting information of document data corresponding to identification information not selected is not changed,
    wherein the preview image of the document data corresponding to the selected target identification information is displayed in the preview screen and the preview image of the document data corresponding to the identification information not selected is not displayed in the preview screen,
    wherein printing based on the document data corresponding to the selected target identification information is performed and printing based on the document data corresponding to the identification information not selected is not performed in a case where the target identification information is selected from the first and second identification information and the print instruction is accepted in a state the first and second identification information are displayed in the preview screen, and
    wherein the preview screen is displayed in a case where preview function is selected via a screen related to printer software generating printing data from data of an extensible markup language paper specification format (XPS format).

22. The information processing method according to claim 21, wherein in a case where a first mode is selected, the second identification information is displayed on the preview screen and, in a case where a second mode is selected, the second identification information is not displayed on the preview screen.

23. The information processing method according to claim 21, further comprising generating a combined document based on the first and second document data.

24. The information processing method according to claim 21, wherein the preview screen includes a setting area for setting the print setting information.

25. The information processing method according to claim 24, wherein the setting area receives N-up printing for arranging a plurality of pages on one sheet and two-sided printing.

* * * * *